(12) United States Patent
Jones

(10) Patent No.: US 6,659,530 B1
(45) Date of Patent: Dec. 9, 2003

(54) RETRACTABLE COVER FOR RECREATIONAL VEHICLE

(76) Inventor: Herbert R. Jones, 1817 Davis Acres Dr., Alpine, AL (US) 35014

( * ) Notice: Subject to any disclaimer, the term of this patent is extended or adjusted under 35 U.S.C. 154(b) by 0 days.

(21) Appl. No.: 10/317,378

(22) Filed: Dec. 11, 2002

(51) Int. Cl.$^7$ .............................................. B60J 11/00
(52) U.S. Cl. ...................... 296/98; 296/163; 160/66; 160/67
(58) Field of Search ..................... 296/98, 163, 175, 296/26.13, 107.08, 108, 171, 105, 136, 165, 37.16, 100.17; 160/66, 67

(56) References Cited

U.S. PATENT DOCUMENTS

| | | | | |
|---|---|---|---|---|
| 3,498,666 A | * | 3/1970 | Harrawood | 296/98 |
| 3,515,428 A | * | 6/1970 | Killion | 296/98 |
| 3,549,198 A | * | 12/1970 | Cappello | 296/98 |
| RE30,664 E | * | 7/1981 | Upton et al. | 160/66 |
| 4,484,777 A | * | 11/1984 | Michel | 296/98 |
| 4,516,802 A | * | 5/1985 | Compton | 296/98 |
| 4,673,208 A | * | 6/1987 | Tsukamoto | 296/98 |
| 4,834,445 A | * | 5/1989 | Odegaard | 296/98 |
| 5,031,955 A | * | 7/1991 | Searfoss | 296/98 |
| 5,292,169 A | * | 3/1994 | O'Brian | 296/98 |
| 5,328,228 A | * | 7/1994 | Klassen | 296/98 |
| 5,368,056 A | * | 11/1994 | Riggi, Jr. | 160/67 |
| 5,429,403 A | * | 7/1995 | Brasher | 296/98 |
| 5,564,234 A | * | 10/1996 | Vermeulen | 296/98 |
| 5,566,918 A | * | 10/1996 | Becker | 296/163 |
| 5,658,037 A | * | 8/1997 | Evans et al. | 296/98 |
| 5,711,568 A | * | 1/1998 | Diem et al. | 296/37.16 |
| 5,732,756 A | * | 3/1998 | Malott | 160/67 |
| 5,829,818 A | * | 11/1998 | O'Daniel | 296/98 |
| 5,944,085 A | * | 8/1999 | Malott | 160/67 |
| RE36,748 E | * | 6/2000 | Stephens et al. | 296/100.17 |
| 6,123,136 A | * | 9/2000 | Williams | 160/67 |
| 6,131,643 A | * | 10/2000 | Cheng et al. | 296/98 |
| 6,152,516 A | * | 11/2000 | Williams | 296/98 |
| 6,425,623 B2 | * | 7/2002 | Nakayama | 296/98 |
| 6,513,858 B1 | * | 2/2003 | Li et al. | 296/136 |

\* cited by examiner

*Primary Examiner*—Kiran Patel

(57) ABSTRACT

A retractable cover for recreational vehicle to provide retractable sunshade comprises a support frame connectable to a recreational vehicle roof. A cover spindle is connected to the support frame. A cover first end is windably connected to the cover spindle. A cover arm is rotatably connected to the support frame. The cover arm is connected to the cover second end. Multiple arched truss arms are rotatably connected to the support frame.

19 Claims, 4 Drawing Sheets

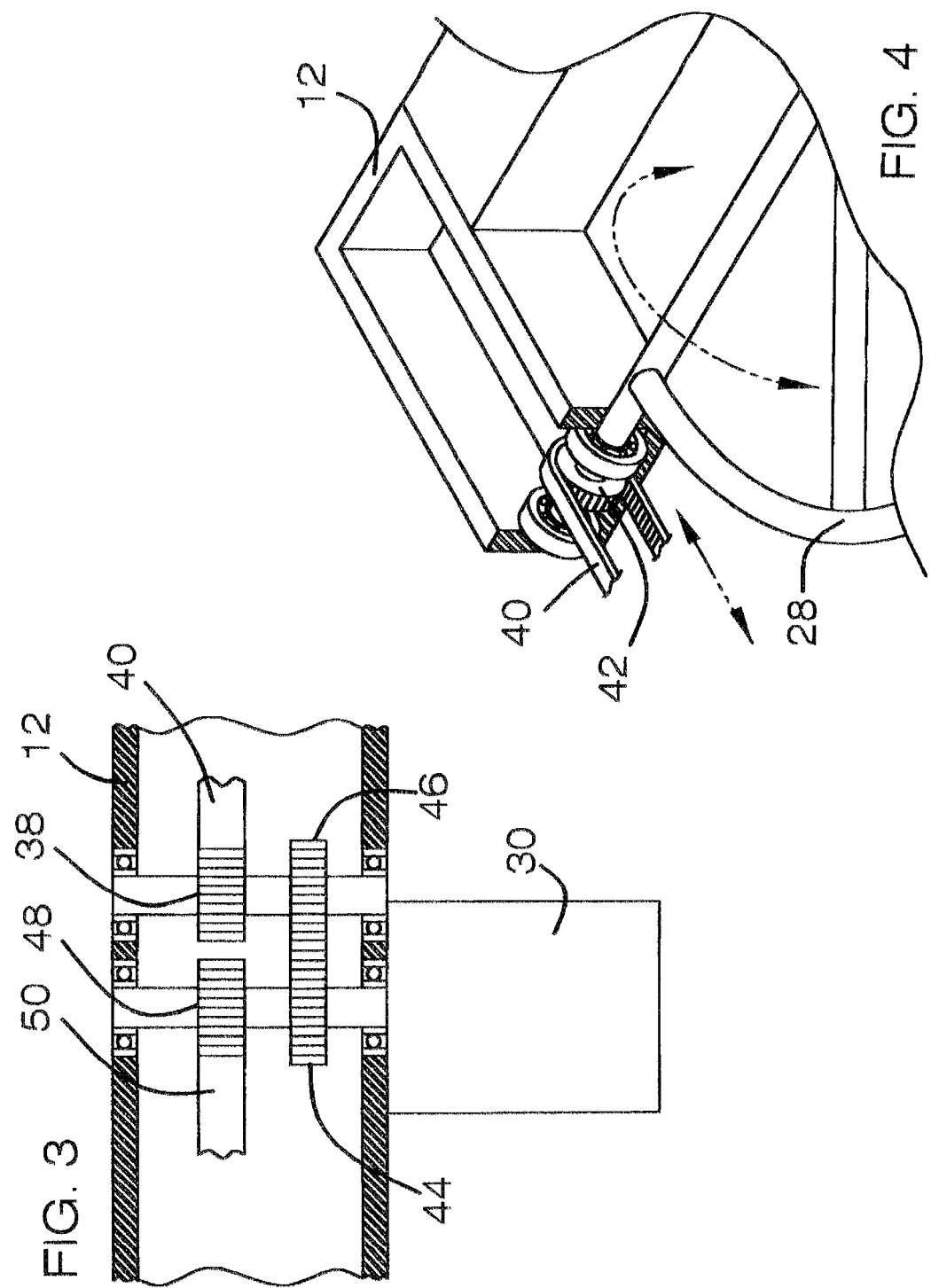

RETRACTABLE COVER FOR RECREATIONAL VEHICLE

BACKGROUND OF THE INVENTION

1. Field of the Invention

The present invention relates to a retractable cover for recreational vehicle for use in connection with covers. The retractable cover for recreational vehicle has particular utility in connection with retractable covers for recreational vehicles that includes retractable truss arms.

2. Description of the Prior Art

Retractable cover for recreational vehicles are desirable for providing shade for a recreational vehicle parked in the sunshine, thus helping to keep its interior temperature cooler for the occupants. It would also make living in a recreational vehicle more comfortable while reducing the reliance upon an air conditioner.

The use of covers is known in the prior art. For example, U.S. Pat. No. 4,727,898 to Guma discloses a portable automatic cover which automatically extends over the object and retracts into a storage position. The cover has one end attached to a roller which is rotatably attached to the object. A number of adjustable brackets are positioned along the upper and side surfaces of the object. Guide elements are attached to the cover and slidably and interlockably connected to the brackets. When the cover is extended over the object, the adjustable brackets automatically unfold, raising the cover upward and extending the flaps sideways to protect the object. For military purposes, when an air compressor or a liquid pump is actuated, the double layer of the cover and the flaps are filled with air or any liquid of desired temperature, thus, providing instant automatic camouflage and also protective covering against enemy detection and attack by heat seeking missiles. However, the Guma '898 patent does not have a retractable semi-circular truss arm that suspends the cover.

Similarly, U.S. Pat. No. 5,230,545 to Huang et al. discloses a convenient awning assembly for parked cars which mainly consists of a pair of fixing frames mounted on car roof near front and rear portions thereof, a driving motor case disposed between the two fixing frames near one lateral side of car roof, two manually-operated awning roller assemblies separately fixed to the fixing frames to provide retractable awnings which can be adhered to windshields by sucker means when they are pulled out; a side awning roller assembly which has an retractable awning connected to a pair of power-actuated bars controlled by the motor in the driving motor case, and two storage compartments each being parallelly attached to inner side of the two fixing frames. With the present invention, a driver can have a shaded place to take a rest at any time he parks the car at a safe place and can provide a temporary rain awning for passengers in rainy days. However, the Huang et al. '545 patent does not have a retractable semi-circular truss arm that suspends the cover.

Lastly, U.S. Pat. No. 2,598,940 to Robie discloses a collapsible cover for vehicles composed of a plurality of bows having the free ends of their legs pivotally connected and having waterproof sheeting connected to the bows so as to be stretched over the latter when they are spread out. The combination therewith of a ground engaging crossbar having its ends extending through the free ends of the legs of the bows to provide the pivotal connection for the bows. A plurality of yieldable means each having one end thereof secured to the outermost one so the bows and the opposite end thereof adapted to be secured to an adjacent portion of the vehicle covered to thereby stretch the sheeting over the bows and urge the cross bar into bearing engagement with the surface supporting the vehicle. However, the Robie '940 patent does not have a retractable semi-circular truss arm that suspends the cover.

While the above-described devices fulfill their respective, particular objectives and requirements, the aforementioned patents do not describe a retractable cover for recreational vehicle that allows retractable covers for recreational vehicles that includes retractable truss arms. The Guma '898, Huang et al. '545 and Robie '940 patents make no provision for a retractable semi-circular truss arm that suspends the cover.

Therefore, a need exists for a new and improved retractable cover for recreational vehicle which can be used for retractable covers for recreational vehicles that includes retractable truss arms. In this regard, the present invention substantially fulfills this need. In this respect, the retractable cover for recreational vehicle according to the present invention substantially departs from the conventional concepts and designs of the prior art, and in doing so provides an apparatus primarily developed for the purpose of retractable covers for recreational vehicles that includes retractable truss arms.

SUMMARY OF THE INVENTION

In view of the foregoing disadvantages inherent in the known types of covers now present in the prior art, the present invention provides an improved retractable cover for recreational vehicle, and overcomes the above-mentioned disadvantages and drawbacks of the prior art. As such, the general purpose of the present invention, which will be described subsequently in greater detail, is to provide a new and improved retractable cover for recreational vehicle and method which has all the advantages of the prior art mentioned heretofore and many novel features that result in a retractable cover for recreational vehicle which is not anticipated, rendered obvious, suggested, or even implied by the prior art, either alone or in any combination thereof.

To attain this, the present invention essentially comprises a support frame connectable to a recreational vehicle roof. A cover spindle is connected to the support frame. A cover first end is windably connected to the cover spindle. A cover arm is rotatably connected to the support frame. The cover arm is connected to the cover second end. Multiple truss arms are rotatably connected to the support frame.

There has thus been outlined, rather broadly, the more important features of the invention in order that the detailed description thereof that follows may be better understood and in order that the present contribution to the art may be better appreciated.

The invention may also include a cover arm motor, a cover arm switch, a truss arm motor, a truss arm switch, a power connection; a control housing, a first drive belt gear, a first drive belt, a first driven belt gear, a drive gear, a driven gear, a second drive belt gear, a second drive belt, and a second driven belt gear. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved retractable cover for recreational vehicle that has all of the advantages of the prior art covers and none of the disadvantages.

It is another object of the present invention to provide a new and improved retractable cover for recreational vehicle that may be easily and efficiently manufactured and marketed.

An even further object of the present invention is to provide a new and improved retractable cover for recreational vehicle that has a low cost of manufacture with regard to both materials and labor, and which accordingly is then susceptible of low prices of sale to the consuming public, thereby making such retractable cover for recreational vehicle economically available to the buying public.

Still another object of the present invention is to provide a new retractable cover for recreational vehicle that provides in the apparatuses and methods of the prior art some of the advantages thereof, while simultaneously overcoming some of the disadvantages normally associated therewith.

Lastly, it is an object of the present invention is to provide a retractable cover for recreational vehicle for retractable covers for recreational vehicles that includes retractable truss arms.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a section 3—3 view of FIG. 2 of the retractable cover for recreational vehicle of the present invention.

FIG. 4 is a section 4—4 view of FIG. 2 of the retractable cover for recreational vehicle of the present invention.

The same reference numerals refer to the same parts throughout the various figures.

DESCRIPTION OF THE PREFERRED EMBODIMENT

Figure 1:
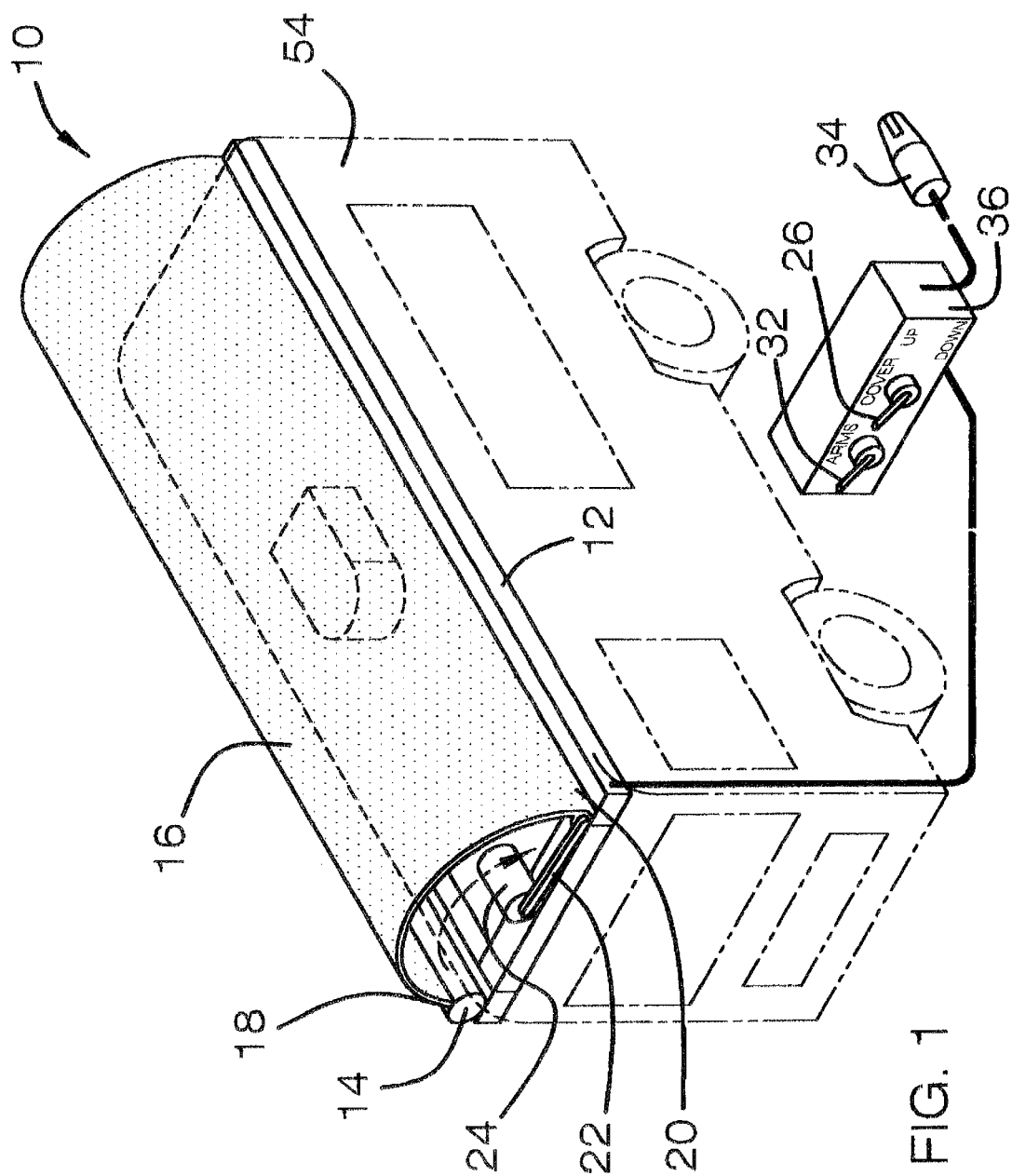
FIG. 1 is a top perspective view of the preferred embodiment of the retractable cover for recreational vehicle constructed in accordance with the principles of the present invention.

Referring now to the drawings, and particularly to FIGS. 1–5, a preferred embodiment of the retractable cover for recreational vehicle of the present invention is shown and generally designated by the reference numeral 10.

In FIG. 1, a new and improved retractable cover for recreational vehicle 10 of the present invention for retractable covers for recreational vehicles that includes retractable truss arms is illustrated and will be described. More particularly, the retractable cover for recreational vehicle 10 has a support frame 12 is connectable to a recreational vehicle roof 54. A cover spindle 14 is connected to the support frame 12. The cover spindle 14 is biased to rewind. A rectangular cover 16 has the first end and the second end. The cover is sun reflective, weatherproof, and opaque in the present example. A cover first end 18 is windably connected to the cover spindle 14. A cover arm 22 is rotatably connected to the support frame 12. The cover arm 22 is connected to a cover second end 20. A cover arm motor 24 is connected to the cover arm 22. A cover arm switch 26 is electrically connected to the cover arm motor 24.

Figure 2:
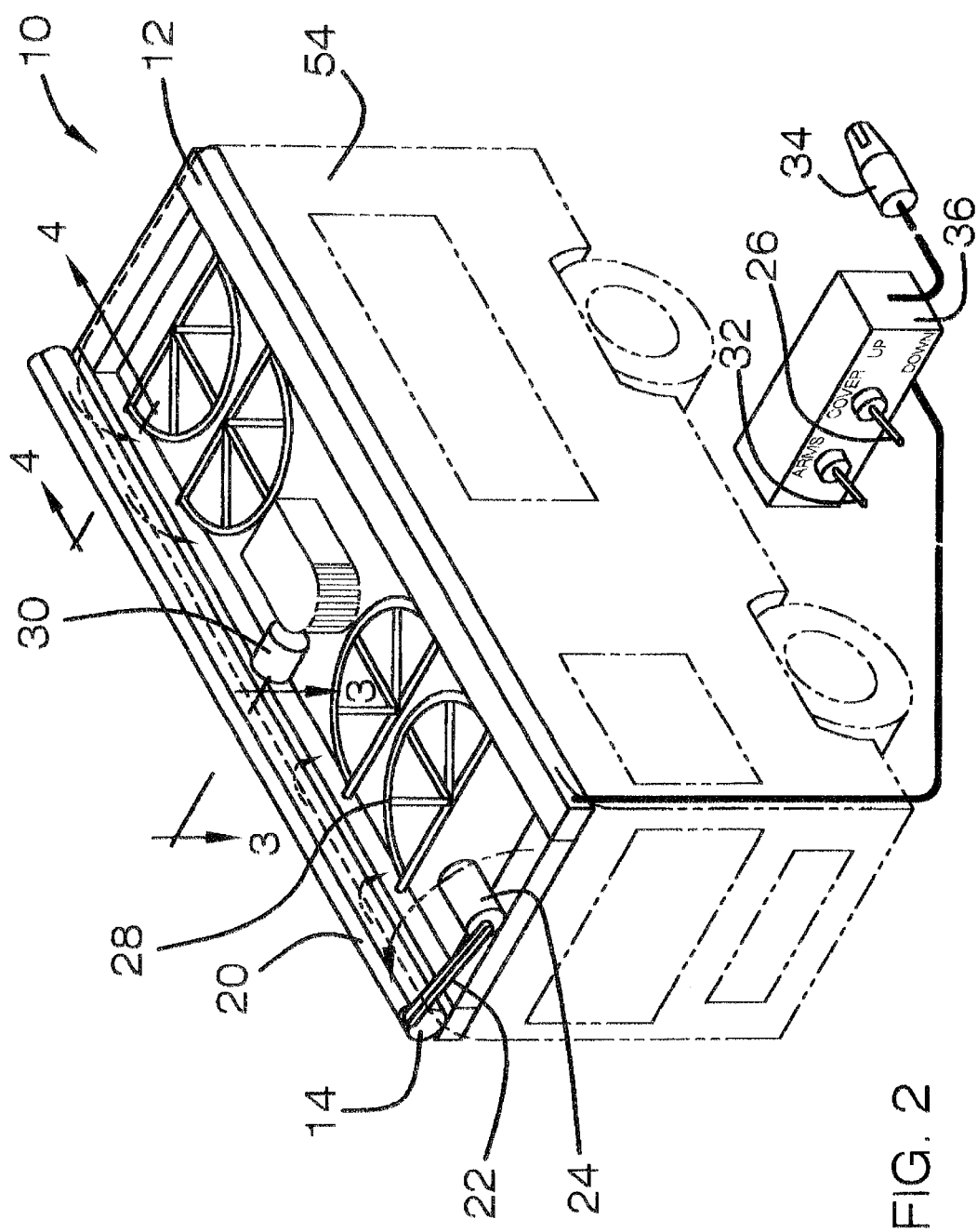
FIG. 2 is a top perspective view of the retractable cover for recreational vehicle of the present invention.

In FIG. 2, the retractable cover for recreational vehicle 10 is illustrated and will be described. More particularly, the retractable cover for recreational vehicle 10 has the support frame 12 is connectable to the roof 54 of the recreational vehicle. The cover spindle 14 is connected to the support frame 12. The cover spindle 14 is biased to rewind. The cover first end 18 (shown in FIG. 1) is windably connected to the cover spindle 14. The cover arm 22 is rotatably connected to the support frame 12. The cover arm 22 is connected to the cover second end 20 (shown in FIG. 1). The cover arm motor 24 is connected to the cover arm 22. The cover arm switch 26 is electrically connected to the cover arm motor 24. A plurality of arched truss arms 28 are rotatably connected to the support frame 12. A truss arm motor 30 is connected to the truss arms 28. A truss arm switch 32 is electrically connected to the truss arm motor 30. A power connection 34 is electrically connected to the cover arm switch 26. The power connection 34 is electrically connected to the truss arm switch 32. A control housing 36 is connected to the cover arm switch 26. The power connection 34 is electrically connected to the truss arm switch 32.

In FIG. 3, the retractable cover for recreational vehicle 10 is illustrated and will be described. A first drive belt gear 38 is connected to the truss arm motor 30. A first drive belt 40 is meshingly corrected to the first drive belt gear 38. A first driven belt gear 42 is meshingly connected to the first drive belt 40. The first driven belt gear 42 is connected to the truss arm 28 (shown in FIG. 4). A drive gear 44 is connected to the truss arm motor 30. A driven gear 46 is meshingly connected to the drive gear 44. A second drive belt gear 48 is connected to the driven gear 46. A second drive belt 50 is meshingly connected to the second drive belt gear 48. A second driven belt gear 52 (not shown) is meshingly connected to the second drive belt 50. The second driven belt gear 52 is connected to the truss arm 28.

In FIG. 3, the retractable cover for recreational vehicle 10 is illustrated and will be described. The first driven belt gear 42 is meshingly connected to the first drive belt 40. The first driven belt gear 42 is connected to the truss arm 28.

Figure 5:
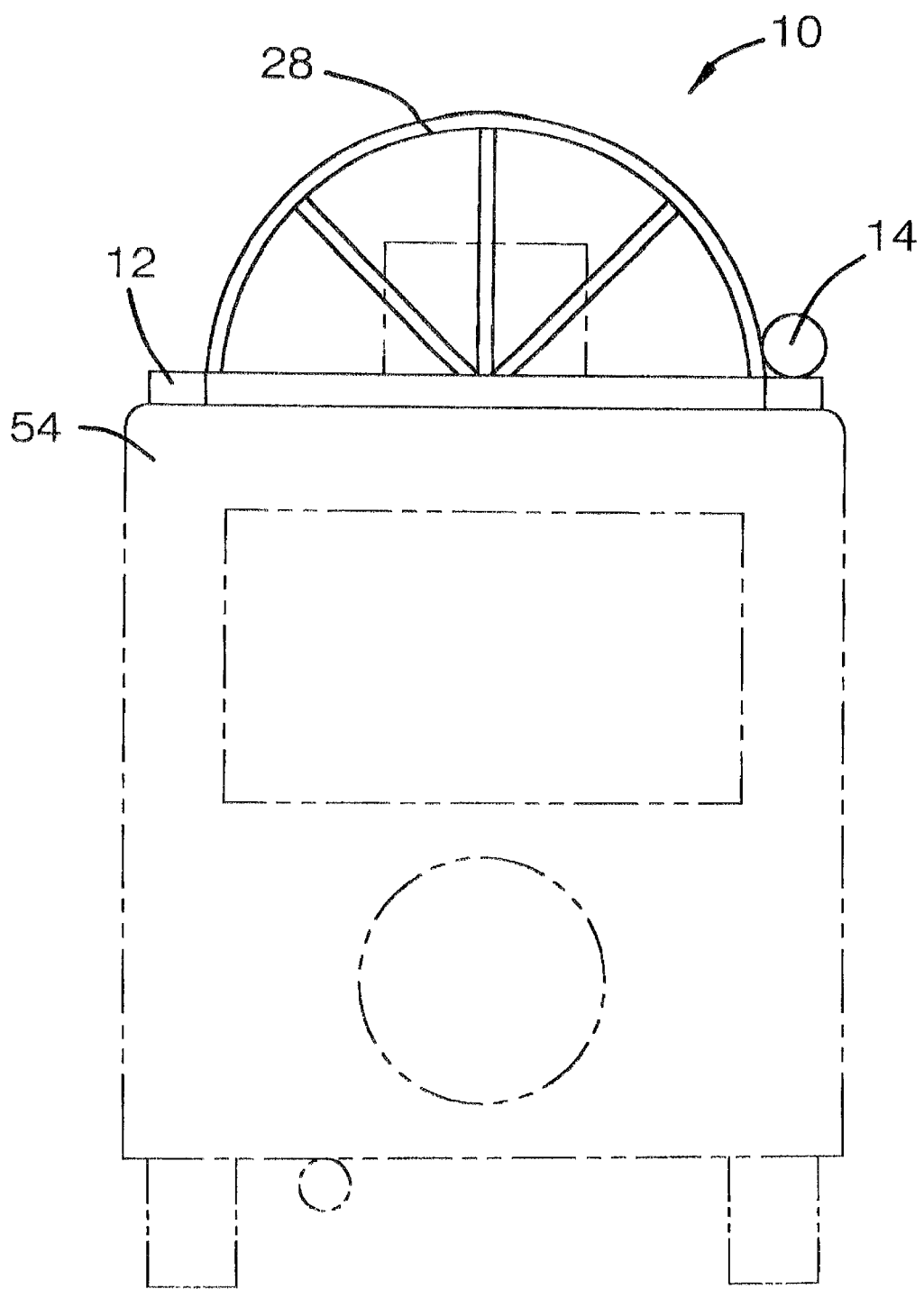
FIG. 5 is a rear side view of the retractable cover for recreational vehicle of the present invention.

In FIG. 5, the retractable cover for recreational vehicle 10 is illustrated and will be described. More particularly, the retractable cover for recreational vehicle 10 has the support frame 12 is connectable to the roof 54 of the recreational vehicle. The cover spindle 14 is connected to the support frame 12. The plurality of arched truss arms 28 are rotatably connected to the support frame 12.

In use it can now be understood that when the recreational vehicle is parked in the hot sun, the owner could activate the cover arm motor 24 to shift the covering 16 to provide coverage. The rectangular covering 16 would provide complete sun coverage for the vehicle, helping to keep the interior cooler and more comfortable for the occupants. When the recreational vehicle is driven the cover could be retracted.

While a preferred embodiment of the retractable cover for recreational vehicle has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such plastic or composite may be used instead of the aluminum truss described. Also, the cover may also be made of any reflective material. And although retractable covers for recreational vehicles that includes retractable truss arms have been described, it should be appreciated that the retractable cover for recreational vehicle herein described is also suitable for covering any stationary object in the sun.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable cover for a recreational vehicle comprising:
   a support frame connactable to a roof of said recreational vehicle;
   a cover spindle connected to said support frame;
   a cover having a first end and a second end, said cover first end windably connected to said cover spindle;
   a cover arm rotatably connected to said support frame, said cover arm connected to said cover second end; and
   a plurality of arched truss arms rotatably connected to said support frame.

2. The retractable cover for the recreational vehicle of claim 1 wherein:
   said cover spindle biased to rewind.

3. The retractable cover for the recreational vehicle of claim 1 further comprising:
   a cover arm motor connected to said cover arm.

4. The retractable cover for the recreational vehicle of claim 3 further comprising:
   a cover arm switch electrically connected to said cover arm motor.

5. The retractable cover for the recreational vehicle of claim 4 further comprising:
   a power connection electrically connected to said cover arm switch.

6. The retractable cover for the recreational vehicle of claim 4 further comprising:
   a control housing connected to said cover arm switch.

7. The retractable cover for the recreational vehicle of claim 1 further comprising:
   a truss arm motor connected to said truss arms.

8. The retractable cover for the recreational vehicle of claim 7 further comprising:
   a truss arm switch electrically connected to said truss arm motor.

9. The retractable cover for the recreational vehicle of claim 8 further comprising:
   a power connection electrically connected to said truss arm switch.

10. The retractable cover for the recreational vehicle of claim 7 further comprising:
    a first drive belt gear connected to said truss arm motor;
    a first drive belt meshingly connected to said first drive belt gear;
    a first driven belt gear meshingly connected to said first drive belt, said first driven belt gear connected to said truss arm;
    a drive gear connected to said truss arm motor;
    a driven gear meshingly connected to said drive gear;
    a second drive belt gear connected to said driven gear;
    a second drive belt meshingly connected to said second drive belt gear; and
    a second driven belt gear meshingly connected to said second drive belt, said second driven belt gear connected to said truss arm.

11. A retractable cover for a recreational vehicle comprising:
    a support frame connectable to a roof of said recreational vehicle;
    a cover spindle connected to said support frame;
    a cover having a first end and a second end, said cover first end windably connected to said cover spindle;
    a cover arm rotatably connected to said support frame, said cover arm connected to said cover second end; and
    a plurality of arched truss arms rotatably connected to said support frame.

12. The retractable cover for the recreational vehicle of claim 11 wherein:
    said cover spindle biased to rewind.

13. The retractable cover for the recreational vehicle of claim 12 further comprising:
    a cover arm motor connected to said cover arm.

14. The retractable cover for the recreational vehicle of claim 13 further comprising:
    a truss arm motor connected to said truss arms.

15. The retractable cover for the recreational vehicle of claim 14 further comprising:
    a cover arm switch electrically connected to said cover arm motor; and
    a truss arm switch electrically connected to said truss arm motor.

16. The retractable cover for the recreational vehicle of claim 15 further comprising:

a power connection electrically connected to said cover arm switch, said power connection electrically connected to said truss arm switch.

17. The retractable cover for the recreational vehicle of claim 16 further comprising:

a control housing connected to said cover arm switch, said power connection electrically connected to said truss arm switch.

18. The retractable cover for the recreational vehicle of claim 17 further comprising:

a first drive belt gear connected to said truss arm motor;

a first drive belt meshingly connected to said first drive belt gear;

a first driven belt gear meshingly connected to said first drive belt, said first driven belt gear connected to said truss arm;

a drive gear connected to said truss arm motor;

a driven gear meshingly connected to said drive gear;

a second drive belt gear connected to said driven gear;

a second drive belt meshingly connected to said second drive belt gear; and a second driven belt gear meshingly connected to said second drive belt, said second driven belt gear connected to said truss arm.

19. A retractable cover for a recreational vehicle comprising:

a support frame connectable to a roof of said recreational vehicle;

a cover spindle connected to said support frame, said cover spindle biased to rewind;

a cover having a first end and a second end, said cover first end windably connected to said cover spindle;

a cover arm rotatably connected to said support frame, said cover arm connected to said cover second end;

a cover arm motor connected to said cover arm;

a cover arm switch electrically connected to said cover arm motor;

a plurality of arched truss arms rotatably connected to said support frame;

a truss arm motor connected to said truss arms;

a truss arm switch electrically connected to said truss arm motor;

a power connection electrically connected to said cover arm switch, said power connection electrically connected to said truss arm switch;

a control housing connected to said cover arm switch, said power connection electrically connected to said truss arm switch;

a first drive belt gear connected to said truss arm motor;

a first drive belt meshingly connected to said first drive belt gear;

a first driven belt gear meshingly connected to said first drive belt, said first driven belt gear connected to said truss arm;

a drive gear connected to said truss arm motor;

a driven gear meshingly connected to said drive gear;

a second drive belt gear connected to said driven gear;

a second drive belt meshingly connected to said second drive belt gear; and a second driven belt gear meshingly connected to said second drive belt, said second driven belt gear connected to said truss arm.

* * * * *